United States Patent
Hamanaka

(10) Patent No.: US 6,650,783 B2
(45) Date of Patent: *Nov. 18, 2003

(54) IMAGE PROCESSING APPARATUS AND METHOD FOR PROCESSING IMAGES WITH DIFFERENT SCALABILITES

(75) Inventor: Akiyoshi Hamanaka, Hachioji (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/229,895

(22) Filed: Jan. 14, 1999

(65) Prior Publication Data

US 2002/0090138 A1 Jul. 11, 2002

(30) Foreign Application Priority Data

Jan. 14, 1998 (JP) .......................... 10-005476

(51) Int. Cl.[7] .............................. G06K 9/36; H04N 7/12
(52) U.S. Cl. .................. 382/240; 382/239; 375/240.16
(58) Field of Search ................................ 382/240, 232, 382/236, 239; 348/14.12, 14.08; 375/240.16, 240.03, 240.12; 708/203

(56) References Cited

U.S. PATENT DOCUMENTS

| 5,821,986 | A | * | 10/1998 | Yuan et al. .............. 348/14.12 |
| 5,828,788 | A | * | 10/1998 | Chiang et al. ............. 382/239 |
| 5,852,565 | A | * | 12/1998 | Demos ..................... 708/203 |
| 6,173,013 | B1 | * | 1/2001 | Suzuki et al. .......... 375/240.16 |

* cited by examiner

Primary Examiner—Wenpeng Chen
(74) Attorney, Agent, or Firm—Fitzpatrick, Cella, Harper & Scinto

(57) ABSTRACT

A single base layer is formed by reducing information of input image data with at least a plurality of scalable factors, and a plurality of enhancement layers having information associated with a plurality of scalable factors are formed by using the base layer, thereby minimizing the amount of data to be transmitted and allowing the receiving side to arbitrarily select one of images with large information amounts based on various scalable factors. A system suited for image selection on the receiving side is also constructed.

26 Claims, 11 Drawing Sheets

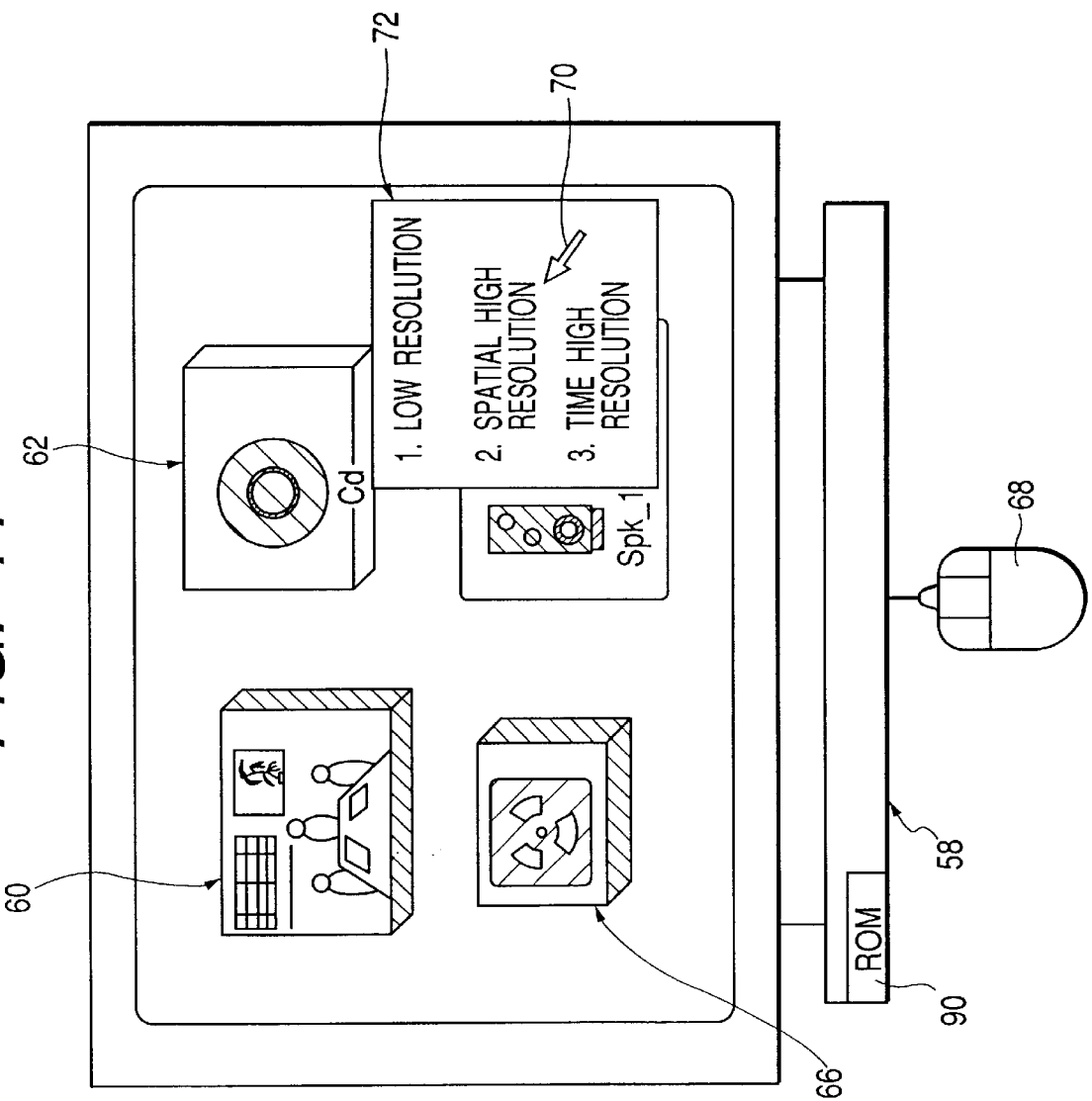

IMAGE PROCESSING APPARATUS AND METHOD FOR PROCESSING IMAGES WITH DIFFERENT SCALABILITES

BACKGROUND OF THE INVENTION

1. Field of the Invention

The present invention relates to an image processing apparatus and method and, more particularly, to an image processing apparatus capable of processing images with a plurality of different scalabilities by hierarchical coding.

2. Related Background Art

Conventionally, as a motion image encoding scheme, MPEG2 has been known. In this MPEG2 scheme, high image quality or a small amount of data to be transmitted can be selected with two scalabilities called spatial scalability and SNR (SN Ratio) scalability. The aim of spatial scalability in MPEG2 is to transmit one of two types of motion image information having different resolutions or image sizes. In general, only one type of image quality, i.e., one type of resolution, is selected, and data is transmitted with the selected resolution.

SNR scalability in MPEG2 targets for transmission of one of two types of motion image information having the same resolution but having different code amounts, which are obtained by, for example, quantizing DCT coefficients with different quantization steps.

In the following description of this specification, of two pieces of motion image information with different data rates in each scalability, information with a smaller data amount will be referred to as a base layer, and information with a larger data amount will be referred as an enhancement layer.

According to another known method, two types of images (base layer and enhancement layer) having different sizes (or resolutions) are simultaneously compressed/encoded by using spatial scalability, and the decoding apparatus chooses between reconstructing an image with low spatial resolution from the base layer and reconstructing an image with high resolution from the enhancement layer, depending on the performance of a decoding circuit, image display apparatus, and the like.

Spatial scalability will be described with reference to FIG. 1 by taking HDTV and NTSC image signals as examples. When an original image is an HDTV image (1440×1152 pixels), a (720×576)-pixel image obtained by thinning out the original image data by ½ in both the X and Y directions will be referred to as a base layer. Image data obtained as a prediction (comparison) image, by encoding an image (expansion base layer) obtained by up-sampling the base layer with the same size as that of the original image, in addition to forward prediction (P) and bidirectional prediction (B) for the original image, will be referred to as an enhancement layer.

According to still another known method, two types of images (base layer and enhancement layer) having different code amounts (more specifically, quantization steps) are simultaneously compressed by using SNR scalability, and the decoding apparatus reconstructs an image with a low rate (low image quality) from the base layer. The decoding apparatus then reconstructs an image with a high rate (high image quality) from both the base layer and the enhancement layer.

SNR scalability will be briefly described below. FIG. 2 shows a conceptual rendering of SNR scalability. Two different quantization coefficients are applied to the same image to generate different pieces of compressed image information with different compression ratios from the same image. In this case, image information with a larger compression ratio, i.e., image information with a low bit rate and low image quality, is defined as a base layer, and image information with a smaller compression ratio, i.e., image information with a high bit rate and high image quality, is defined as an enhancement layer. On the decoding apparatus side, the image information of the base layer and the image information of the enhancement layer are added together to obtain an image with a small compression ratio and high image quality.

As described above, when spatial scalability or SNR scalability is to be used in MPEG2, only one of these scalabilities can be selected. A conventional encoding apparatus cannot therefore encode image data by using a plurality of scalabilities at once. In other words, only one type of scalability can be designated in one image sequence. Upon reception of image information encoded by using any one of the scalabilities, the decoding apparatus has only the following two types of image qualities as choices: a low-quality image decoded from only the base layer and a high-quality image obtained by synthesizing an image decoded from the base layer and an image decoded from the enhancement layer.

In the prior art, therefore, selection of the image quality or decoding rate cannot be done in accordance with the performance of the decoding apparatus or receiver's need.

Obviously, the above problem is common to so-called hierarchical encoding performed for two or more types of factors as well as to MPEG2.

SUMMARY OF THE INVENTION

It is an object of the present invention to solve the above problem.

It is another object of the present invention to provide an image processing apparatus which allows selection of an arbitrary scalable factor on the receiving end and can minimize the amount of data transmitted.

In order to achieve the above objects, according to one preferred aspect of the present invention, there is provided an image processing apparatus comprising (a) means for forming a single base layer by reducing information of input image data with at least a plurality of scalable factors, and (b) means for forming a plurality of enhancement layers having information associated with a plurality of scalable factors by using the base layer.

According to another aspect of the present invention, there is provided an image processing apparatus comprising (a) reconstruction means for extracting data of a base layer obtained from input data by reducing information of image data by using at least a plurality of scalable factors, and reconstructing an image signal from the extracted data of the base layer, and (b) forming means for extracting data of a plurality of enhancement layers having information associated with a plurality of scalable factors from the input data, and forming a plurality of image signals having information associated with the plurality of factors in an amount larger than that of the reconstructed image signal of the base layer from the data of the base layer and the data of the plurality of enhancement layer.

The above and other objects, features, and advantages of the present invention will be apparent from the following detailed description in conjunction with the accompanying drawings and the appended claims.

BRIEF DESCRIPTION OF THE DRAWINGS

FIG. 11 is a view showing how images are displayed on the system in FIG. 9.

DETAILED DESCRIPTION OF THE PREFERRED EMBODIMENTS

A preferred embodiment of the present invention will be described in detail below with reference to the accompanying drawings.

Figure 3:
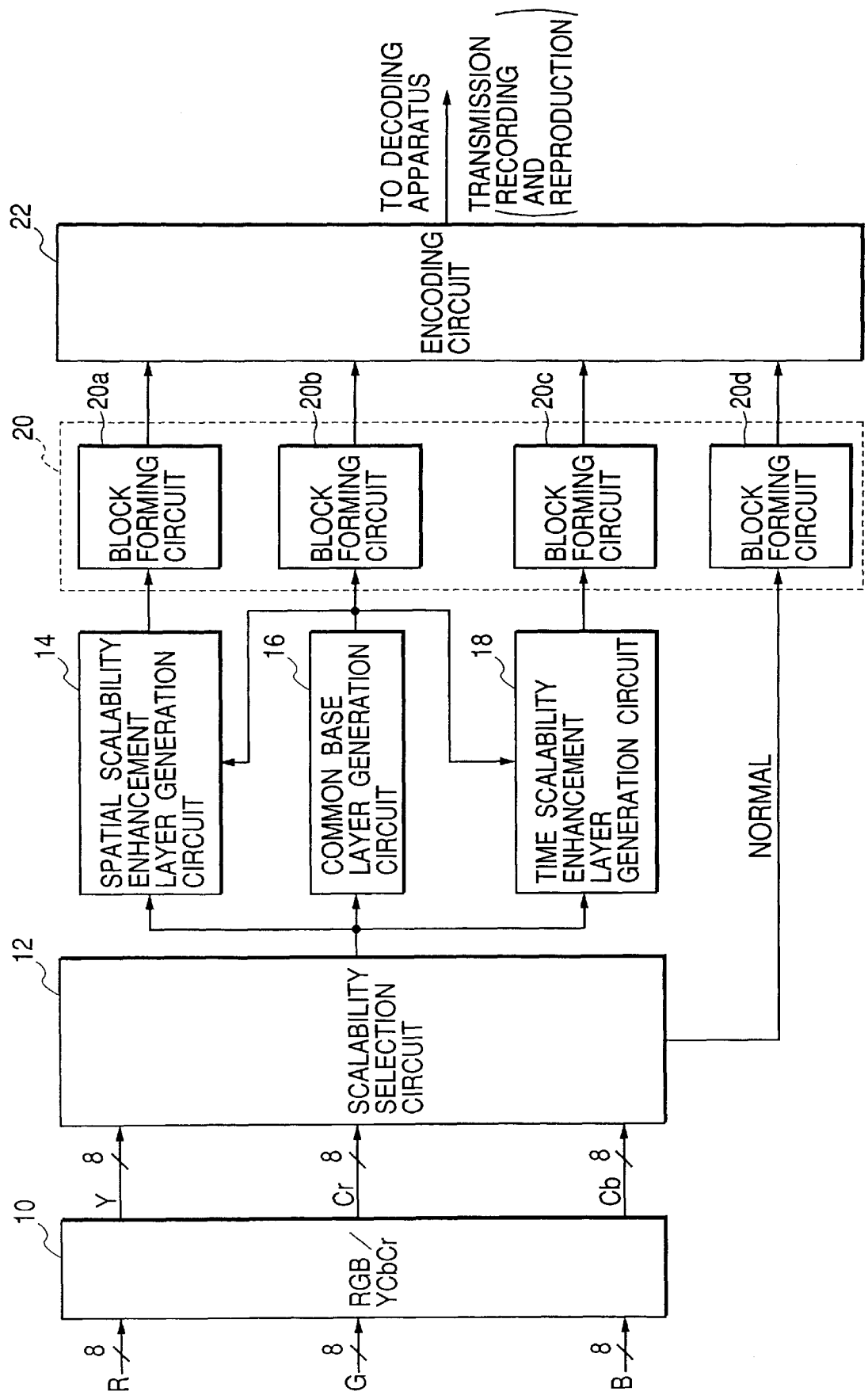
FIG. 3 is a block diagram schematically showing an encoding apparatus according to an embodiment of the present invention.
Figure 7:
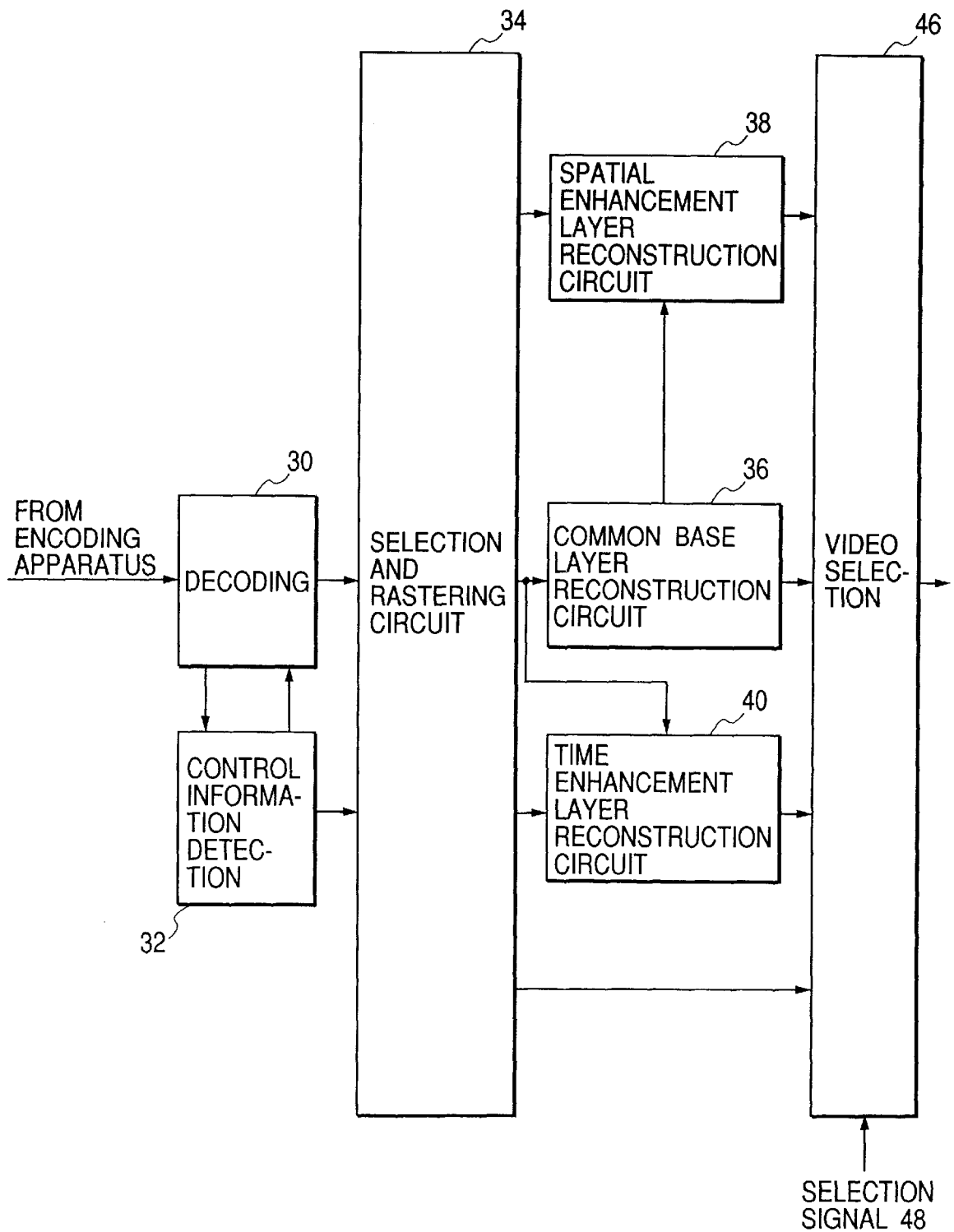
FIG. 7 is a block diagram showing the arrangement of a decoding apparatus corresponding to the encoding apparatus in FIG. 3.

FIG. 3 is a block diagram showing the schematic arrangement of an encoding apparatus according to an embodiment of the present invention. FIG. 7 is a block diagram showing the schematic arrangement of a decoding apparatus corresponding to this encoding apparatus. Both the apparatuses handle interlace image signals such as NTSC signals. In this embodiment, both spatial scalability and time scalability are used.

Figure 4:
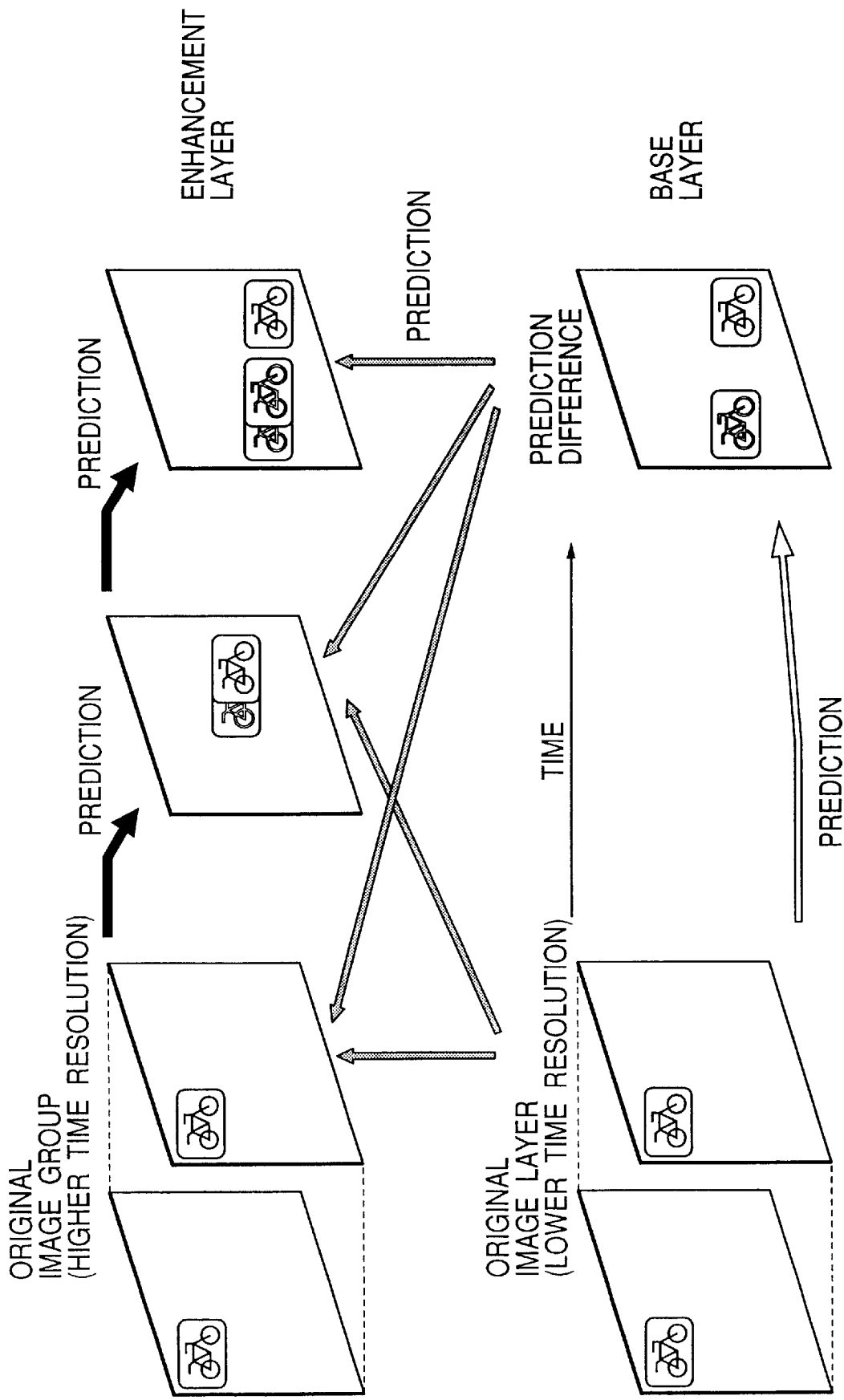
FIG. 4 is a diagram for explaining time scalability.

Time scalability will be described below with reference to FIG. 4. Referring to FIG. 4, an image group obtained by averaging original images every two frames and performing frame thinning-out will be referred to as a base layer. An image group obtained by predicting the original images of all the frames from frames in the base layer which are adjacent to each other along the time axis and frames in all the frames which are adjacent to each other along the time axis, and encoding the images by calculating prediction differences will be referred to as an enhancement layer. In this manner, the base layer with lower resolution in the time axis direction can be obtained, together with the enhancement layer with higher resolution in the time axis direction, which is obtained by using the base layer.

The arrangement shown in FIG. 3 will be described first. This arrangement includes a conversion circuit 10 for converting RGB image data to YCbCr image data with 4:2:0, a scalability selection circuit 12 for selecting use or nonuse of scalability for the output data from the conversion circuit 10 and a mode to be used, a spatial scalability enhancement layer generation circuit 14 for generating the data of an enhancement layer corresponding to spatial scalability from the output from the scalability selection circuit 12 when it selects the use of scalability, a common base layer generation circuit 16 for generating the data of a base layer common to spatial and time scalabilities from the output from the scalability selection circuit 12 when it selects the use of scalability, and a time scalability enhancement layer generation circuit 18 for generating the data of an enhancement layer corresponding to time scalability from the output from the scalability selection circuit 12 when it selects the use of scalability.

This arrangement also includes a block forming processing circuit 20 for dividing the outputs from the generation circuits 14, 16, and 18 and the output from the scalability selection circuit 12 upon selection of the nonuse of scalability into blocks, each consisting of n (n≧2) pixels, in unit of frames or fields in the horizontal and vertical directions, combining the blocks into macroblocks for Y, Cb, and Cr, respectively, and more specifically, a macroblock consisting of a blocks, a macroblock consisting of b blocks, and a macroblock consisting of c blocks, and outputting the respective macroblocks. The block forming processing circuit 20 includes four block forming circuits 20a, 20b, 20c, and 20d corresponding to the outputs from the generation circuits 14, 16, and 18 and the output from the scalability selection circuit 12 upon selection of the nonuse of scalability.

This arrangement further includes an encoding circuit 22 for compressing/encoding the YCrCb block data output from the block forming processing circuit 20 in units of macroblocks by an encoding scheme known as MPEG2. More specifically, the encoding circuit 22 compresses/encodes the image data from the block forming processing circuit 20 by using a predictive encoding scheme (selection of intra-coded picture (I-picture)/inter-coded picture (P- or B-picture)), orthogonal transform (DCT), quantization, and variable-length coding.

The RGB/YCbCr conversion circuit 10 converts R, G, and B image signals, each consisting of 8 bits, into Y, Cb, Cr signals, each consisting of 8 bits, with 4:2:0.

When scalability is to be used in encoding, the scalability selection circuit 12 supplies the output from the conversion circuit 10 to the generation circuits 14, 16, and 18. The generation circuits 14, 16, and 18 then generate a spatial scalability enhancement layer, a common base layer, and a time scalability enhancement layer, respectively, and supply them to the block forming processing circuit 20.

The block forming processing circuit 20 breaks up the input image data into n-pixel blocks in units of frames or fields in the horizontal and vertical directions, combines the blocks into macroblocks for Y, Cb, and Cr, respectively, and more specifically, a macroblock consisting of a blocks, a macroblock consisting of b blocks, and a macroblock consisting of c blocks, and outputs them. As described above, the block forming processing circuit 20 includes the block forming circuits 20a, 20b, 20c, and 20d, four in total, for the respective layers and the output in the case of the nonuse of scalability.

The block forming circuits 20a to 20c of the block forming processing circuit 20 form the respective layer data from the generation circuits 14, 16, and 18 into blocks in the manner described above, and supply them to the encoding circuit 22. The encoding circuit 22 first performs prediction processing upon selection of a predictive coding scheme (intra-coded picture (I-picture)/inter-coded picture (P- or B-picture)), and then compresses/encodes the output data from the block forming circuits 20a to 20c by orthogonal transform (DCT), quantization, and variable-length encoding.

When no scalability is to be used (normal mode), the scalability selection circuit 12 supplies the output from the conversion circuit 10 to the block forming circuit 20d of the block forming processing circuit 20 without any change. The encoding circuit 22 first performs prediction processing for the block data from the block forming circuit 20d upon selection of a predictive coding scheme ((intra-coded picture (I-picture)/inter-coded picture (P- or B-picture)), and then compresses/encodes the resultant data by orthogonal transform (DCT), quantization, and variable-length coding.

A spatial scalability enhancement layer, a common base layer, a time scalability enhancement layer in this embodiment will be described further in detail below with reference to FIGS. 5 and 6.

Figure 5:
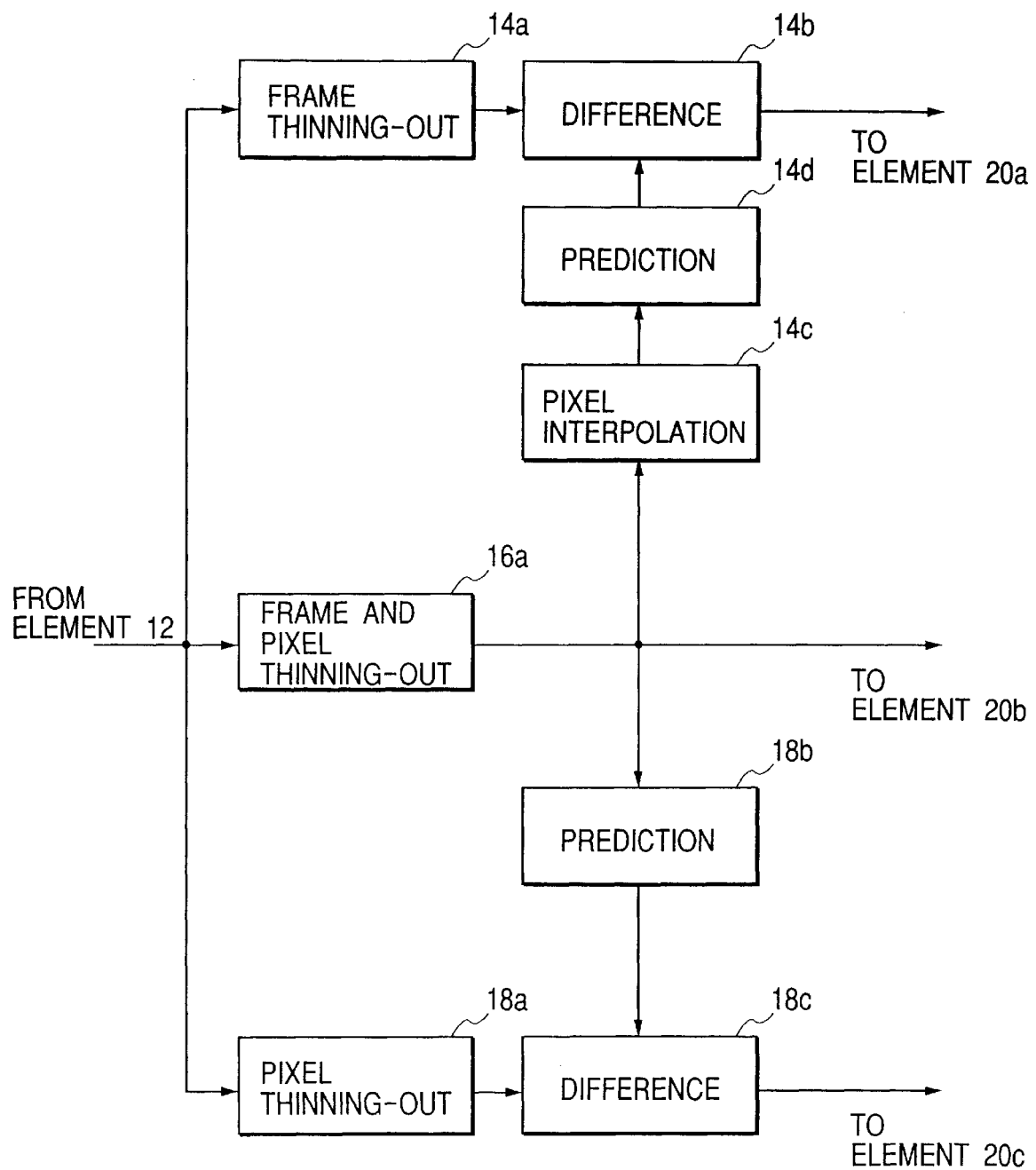
FIG. 5 is a block diagram showing the details of the main part of the arrangement in FIG. 3.

FIG. 5 is a block diagram showing the details of a main part including the circuits 14, 16, and 18 in FIG. 3. Referring to FIG. 5, circuits 14a, 14b, 14c, and 14d are included in the circuit 14 in FIG. 3, a circuit 16a is included in the circuit 16 in FIG. 3, and circuits 18a, 18b, and 18c are included in the circuit 18 in FIG. 3.

Figure 6:
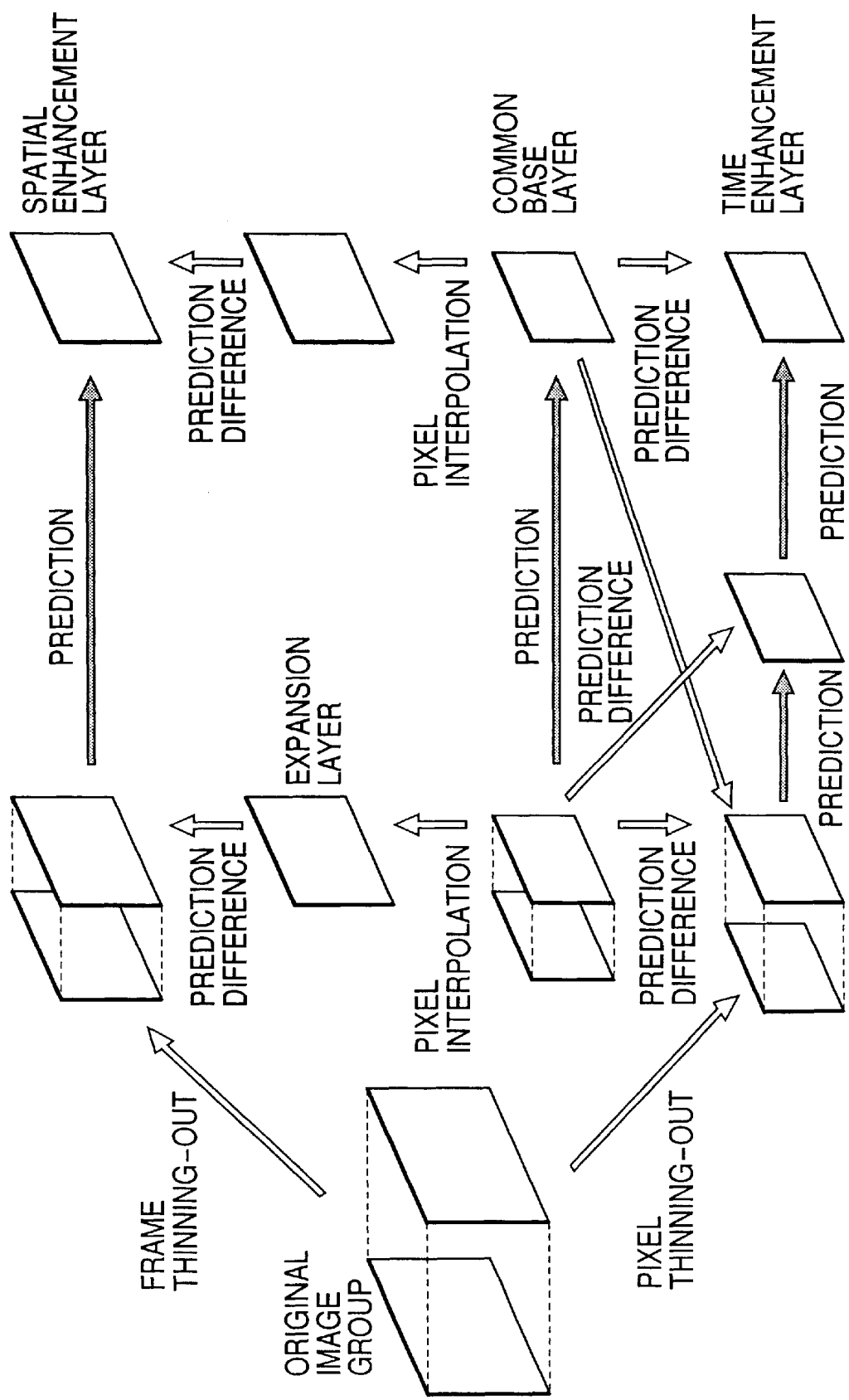
FIG. 6 is a conceptual rendering for explaining the operation of the arrangement in FIG. 5.

As shown in FIG. 6, when an original image group with high time resolution and high spatial resolution is input from the scalability selection circuit 12 in FIG. 3, low-pass filtering is performed first along the time axis to average two adjacent frames, and one of the two adjacent frames is thinned out, thereby reducing the time resolution of the original image group to ½. The pixel thinning-out circuit 18a band-limits an original image by a two-dimensional low-pass filter, and then performs pixel thinning-out by sub-sampling or the like to reduce the spatial resolution of the original image group to ½.

The frame and pixel thinning-out circuit 16a continuously performs the above two processes to reduce both the spatial and time resolutions of the original image, thereby obtaining the common base layer shown in FIG. 6. In this case, to reduce the circuit size, the circuit 16a may supply the output from the circuit 14a to a pixel thinning-out circuit (not shown) or the output from the circuit 18a to a frame thinning-out circuit (not shown).

The image group of the common base layer is equal in frame rate to the image group output from the frame thinning-out circuit 14a, and is different in the number of pixels of each frame therefrom. For this reason, the image group of the common base layer is supplied to the image interpolation circuit 14c to become equal in the number of pixels to the output from the circuit 14a. The image group obtaining by simply increasing the number of pixels of each image of the common base layer will be referred to as an expansion layer. The prediction circuit 14d predicts an output from the frame thinning-out circuit 14a on the basis of the image of the expansion layer. The difference circuit 14b calculates the difference between this prediction value and the output from the frame thinning-out circuit 14a.

In this case, prediction may be simply performed by only calculating the difference between an image of the expansion layer and an output from the frame thinning-out circuit 14a, which temporally correspond to each other as shown in FIG. 6. However, prediction may also be performed by using a plurality of images of the expansion layer.

The difference value output from the difference circuit 14b is supplied as the image group of the spatial enhancement layer to the block forming circuit 20a. In addition, the image group of the common base layer is supplied to the block forming circuit 20b.

The image output from the pixel thinning-out circuit 18a is equal in the number of pixels to the image group of the common base layer, and hence prediction can be performed by the prediction circuit 18b, as shown in FIG. 5. The circuits 18a, 18b, and 18c calculate the difference between the prediction image and the image from the circuit 18a. The output from the circuit 18c is supplied as a time enhancement layer to the block forming circuit 20c.

In this embodiment, in each prediction process indicated by hatching in FIG. 6, after image data is subjected to the DCT and quantization, a local decoded value is calculated from the resultant value, and a prediction difference is calculated on the basis of the decoded value. That is, this process is performed in the encoding circuit 22 in FIG. 3. As described above, in this embodiment, a time enhancement layer and a spatial enhancement layer are generated from a raster image before block formation, i.e., the DCT. However, a time enhancement layer and a spatial enhancement layer can also be generated by calculating prediction values using values obtained by temporarily and locally decoding data obtained by quantizing DCT coefficient after the DCT. In this case, each circuit for the prediction process indicated by hatching and each difference circuit may be combined into one difference circuit.

In addition, in the above embodiment, only a spatial enhancement layer and a time enhancement layer are prepared. However, an SN enhancement layer may be prepared from the above common base layer. Furthermore, two arbitrary layers may be prepared from these three enhancement layers, or a plurality of enhancement layers each generated by combining two arbitrary layers may be prepared.

According to the apparatus on the encoding side, which has the above arrangement, a plurality of scalabilities can be arbitrarily selected on the decoding side to meet various user's demands. In addition, since a common base layer is used to generate each enhancement layer, the circuit configuration on the transmitting side can be minimized. Furthermore, the amount of data to be transmitted can be minimized.

The arrangement shown in FIG. 7 will be described next. This arrangement includes a decoding apparatus 30 for decoding MPEG2 bit stream data from the encoding apparatus in FIG. 3, a control information detection circuit 32 for reading the header information of the MPEG2 bit stream data from the encoding apparatus in FIG. 3 and controlling the overall operation of the decoding apparatus in FIG. 7, including the decoding processing in the decoding apparatus 30, and a selection and rastering circuit 34 for rastering the image data decoded by the decoding apparatus 30, and selecting the subsequent process on the basis of the scalability flag detected by the control information detection circuit 32.

A common base layer reconstruction circuit 36 reconstructs the data of a common base layer from the output from the selection and rastering circuit 34 which corresponds to the output from the common base layer generation circuit 16 of the encoding apparatus in FIG. 3.

A spatial enhancement layer reconstruction circuit 38 refers to the image data of the expansion layer obtained by the common base layer reconstruction circuit 36 to reconstruct an image with high spatial resolution from the data of the spatial scalability enhancement layer on the basis of the output from the selection and rastering circuit 34 which corresponds to the output from the spatial scalability enhancement layer generation circuit 14 of the encoding apparatus in FIG. 3.

A time enhancement layer reconstruction circuit 40 refers to the information input to the common base layer reconstruction circuit 36 which corresponds to the output from the common base layer generation circuit 16 to reconstruct an image with high time resolution from the data of the time scalability enhancement layer on the basis of the output from the selection and rastering circuit 34 which corresponds to the output from the time scalability enhancement layer generation circuit 18 of the encoding apparatus in FIG. 3.

A video selection device 46 selects the video signal output from the spatial enhancement layer reconstruction circuit 38, the video signal from the time enhancement layer reconstruction circuit 40, the video signal output from the common base layer reconstruction circuit 36, or the video signal output from the selection and rastering circuit 34. As described above, when scalability is used, the video selection device 46 can select an image signal with low time/spatial resolution, an image signal with high time resolution, or an image signal with high spatial resolution.

The operation of the decoding apparatus in FIG. 7 will be described. A transmitted (recorded/reproduced) bit stream is input to the decoding apparatus 30. The header information of this bit stream is supplied to the control information detection circuit 32. The control information detection circuit 32 decodes the encoding condition from the header information, and supplies a control signal corresponding to the decoded contents to the decoding apparatus 30 and the selection and rastering circuit 34.

The decoding apparatus 30 decodes (variable-length decoding, inverse quantization, and inverse DCT) the received data in accordance with the coding scheme (interframe/intraframe coding) designated by the control signal from the control information detection circuit 32, and supplies the resultant data to the selection and rastering circuit 34. The selection and rastering circuit 34 rasters the image data from the decoding apparatus 30, and supplies the output from the decoding apparatus 30 to the reconstruction circuits 36, 38, and 40 when scalability is used, and to the video selection device 46 when no scalability is used (normal mode), in accordance with the control information from the control information detection circuit 32. In the former case, the image data of the common base layer is supplied to the common base layer reconstruction circuit 36, the data of the spatial scalability enhancement layer is supplied to the spatial enhancement layer reconstruction circuit 38, and the data of the time scalability enhancement layer is supplied to the time enhancement layer reconstruction circuit 40. These data are then independently processed by the reconstruction circuits 36, 38, and 40.

Figure 8:
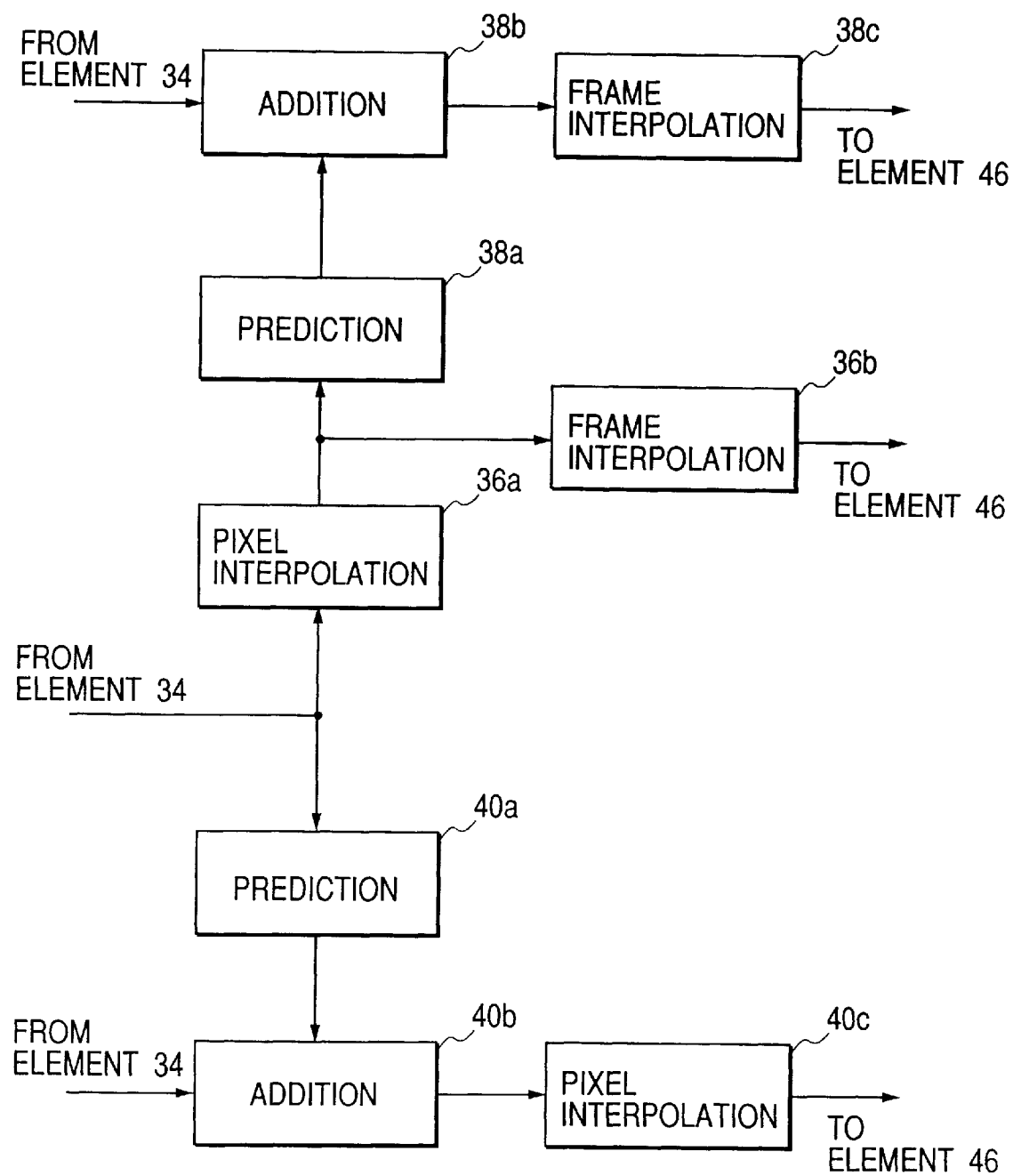
FIG. 8 is a block diagram showing the details of the main part of the arrangement in FIG. 7.

FIG. 8 is a block diagram for explaining the details of the common base layer reconstruction circuit 36, the spatial enhancement layer reconstruction circuit 38, and the time enhancement layer reconstruction circuit 40 in FIG. 7. Each layer reconstruction operation will be described in detail below with reference to FIGS. 6 and 8.

Referring to FIG. 8, circuits 36a and 36b are included in the circuit 36 in FIG. 7, circuits 38a, 38b, and 38c are included in the circuit 38 in FIG. 7, and circuits 40a, 40b, and 40c are included in the circuit 40 in FIG. 7.

The common base layer information extracted by the selection and rastering circuit 34 is supplied to the pixel interpolation circuit 36a to be subjected to pixel interpolation. As a result, an image having the same size as that of the original image is reconstructed. This operation is the same as that of the pixel interpolation circuit 14c in encoding operation. With this operation, an image of an expansion layer is obtained. Note that when the frame interpolation circuit 36b performs frame interpolation for the image of this expansion layer, an image signal equal in frame rate and the number of pixels to the original image can be obtained. As is obvious, both the time and spatial resolutions of the image signal output from the frame interpolation circuit 36b are low.

In this case, the pixel interpolation circuit 36a serves as both a circuit for reconstructing an image (expansion layer), from this common base layer, which is to be combined with the spatial enhancement layer, and a circuit for reconstructing an image from the common base layer itself. That is, this circuit 36a is used for the two purposes. This can reduce the circuit size. If, however, the manner of interpolation by the circuit 36a is to be changed in accordance with the above two purposes, circuits for the two purposes may be independently prepared.

The spatial enhancement layer information extracted by the selection and rastering circuit 34 is supplied to the addition circuit 38b. The addition circuit 38b adds this information to the prediction information obtained by the prediction circuit 38a from the expansion base layer information obtained by the pixel interpolation circuit 36a. Since the number of frames of the output from this addition circuit 38b is equal to that of the common base layer, the output from the circuit 38b is supplied to the frame interpolation circuit 38c. The circuit 38c then performs frame interpolation for this output to obtain an image signal equal in frame rate and the number of pixels to the original image. This image information is low in time resolution but high in spatial resolution.

The time enhancement layer extracted by the selection and rastering circuit 34 is supplied to the addition circuit 40b to be added to the prediction information obtained by the prediction circuit 40a from the common base layer information. Since the output from this addition circuit 40b is equal in the number of pixels to the common base layer, the output from the circuit 38b is supplied to the pixel interpolation circuit 40c. The circuit 38c then performs spatial pixel interpolation for the output to obtain an image signal equal in frame rate and the number of pixels to the original image. This image information is low in spatial resolution but high in time resolution.

Finally, the three types of image signals, i.e., the high-spatial-resolution image signal, low-resolution image signal, and high-time-resolution image signal, output from the circuits 36, 38, and 40 are input to the video selection device 46. The video selection device 46 is switched by a selection signal 48, and can obtain all the three types of image signal when they are transmitted by using scalability. The video selection device 46 can selectively output these signals. When the signals are transmitted without using any scalability, only the image information decoded by the decoding apparatus 30 is output.

Figure 9:
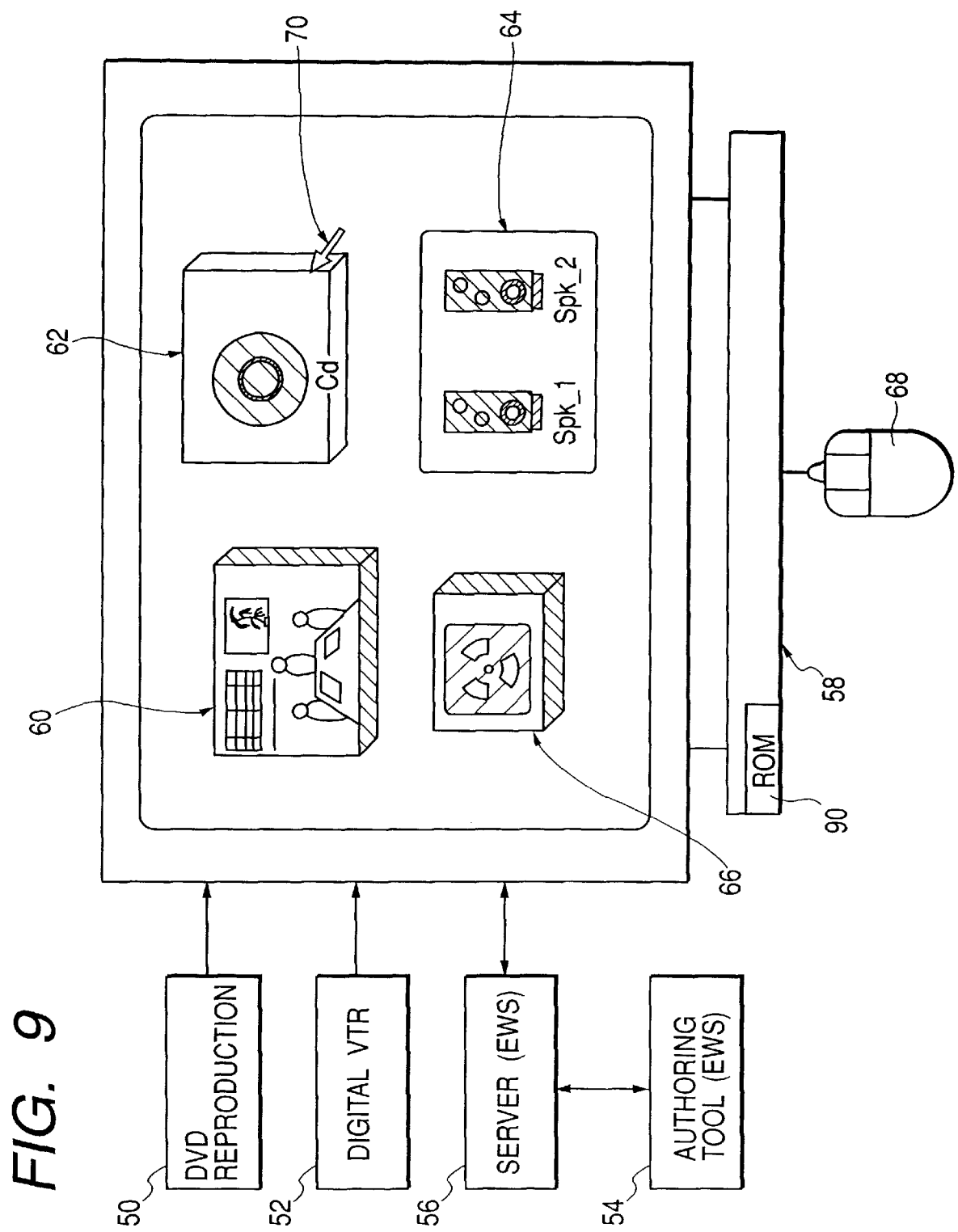
FIG. 9 is a view showing an example of the arrangement of a system using the apparatus in FIG. 7.

An example of a system including the above decoding apparatus will be described next. FIG. 9 is a block diagram showing the schematic arrangement of this system. The system includes a DVD reproduction apparatus 50, a digital VTR 52, an authoring tool (EWS) 54 for a digital image, a server (EWS) 56 for the tool 54, and a personal computer (terminal) 58. Icons 60, 62, 64, and 66 are displayed on the monitor screen of the computer 58. The system also includes a mouse 68 connected to the computer 58. A mouse cursor 70 corresponds to the mouse 68.

Figure 1:
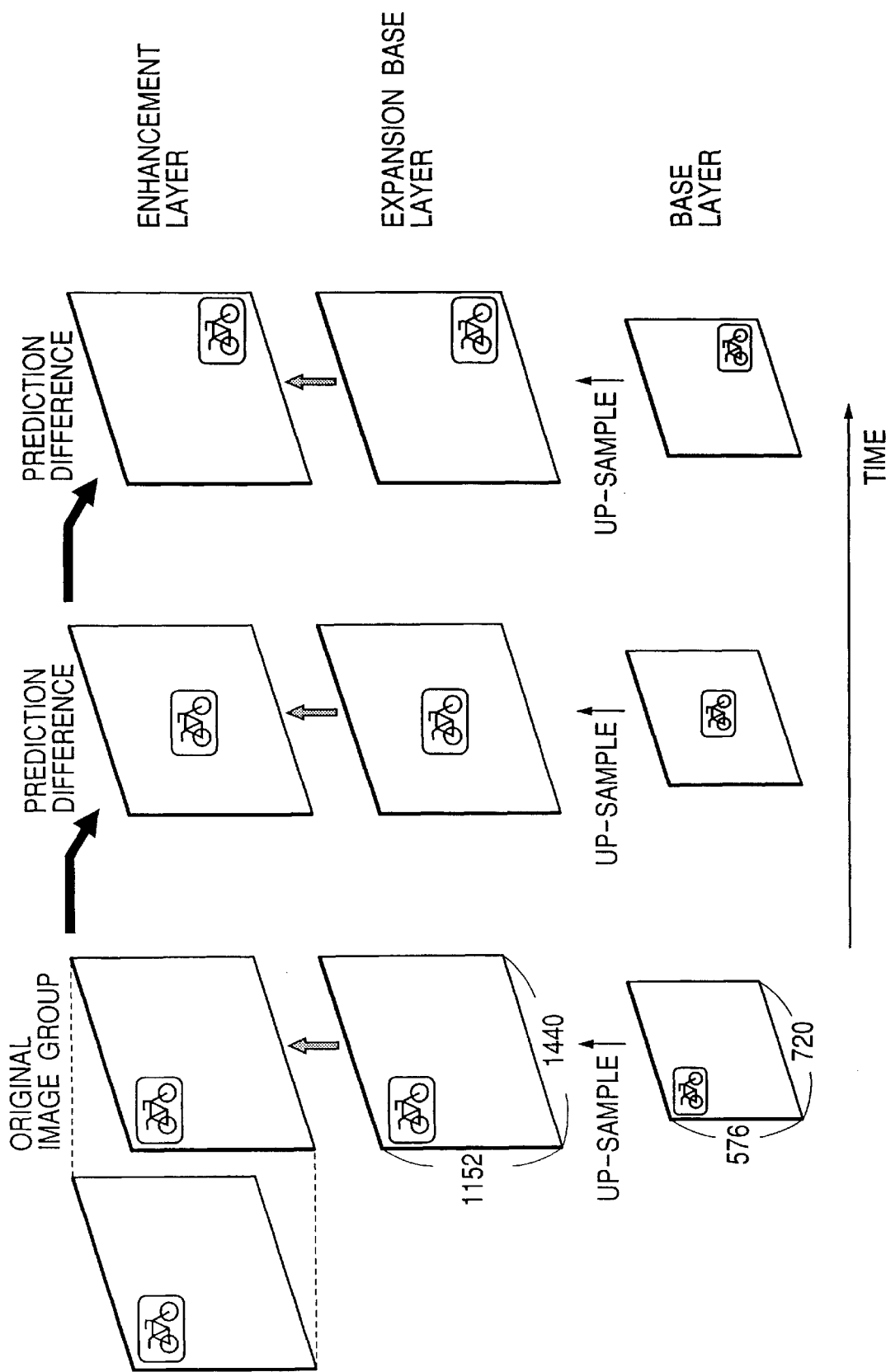
FIG. 1 is a diagram for explaining spatial scalability.
Figure 2:
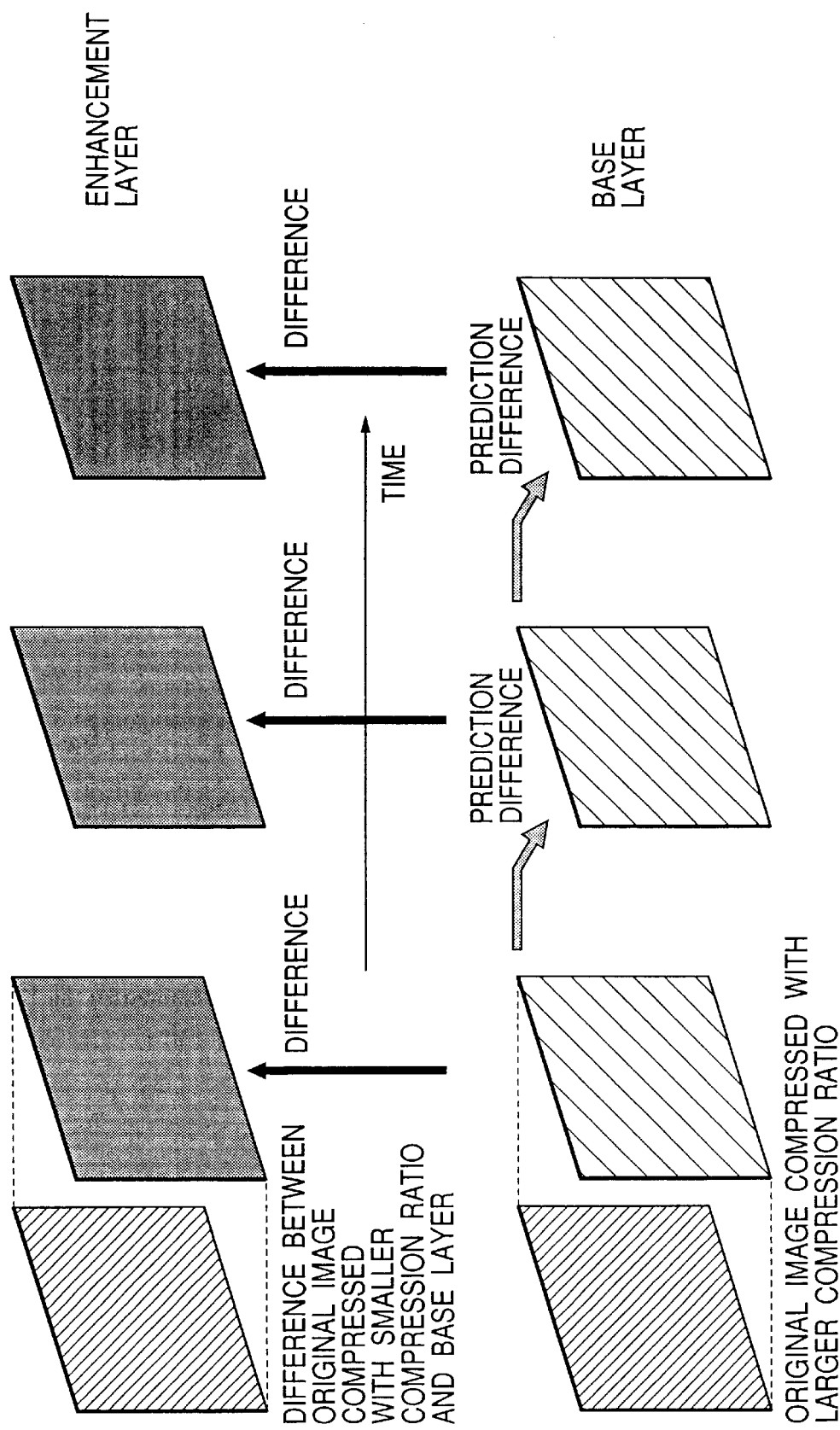
FIG. 2 is a diagram for explaining SNR scalability.

Each of the DVD reproduction apparatus 50, the digital VTR 52, and the tool 54 has an arrangement corresponding to the decoding apparatus in FIG. 2. That is, each of the outputs from the DVD reproduction apparatus 50, the digital VTR 52, and the tool 54 corresponds to the output from the video selection device 46.

The icon 60 displayed on the monitor screen of the computer 58 indicates an image associated with a digital motion image from the DVD reproduction apparatus 50; the icon 62, an image associated with a digital motion image from the digital VTR 52; and the icons 64 and 66, images associated with digital motion images from the tool 54 (i.e., the server 56). As described above, the graphic patterns of the icons 60 to 66 are formed from the start frames of the corresponding digital motion images or the common base layers of arbitrary I-frames.

Figure 10:
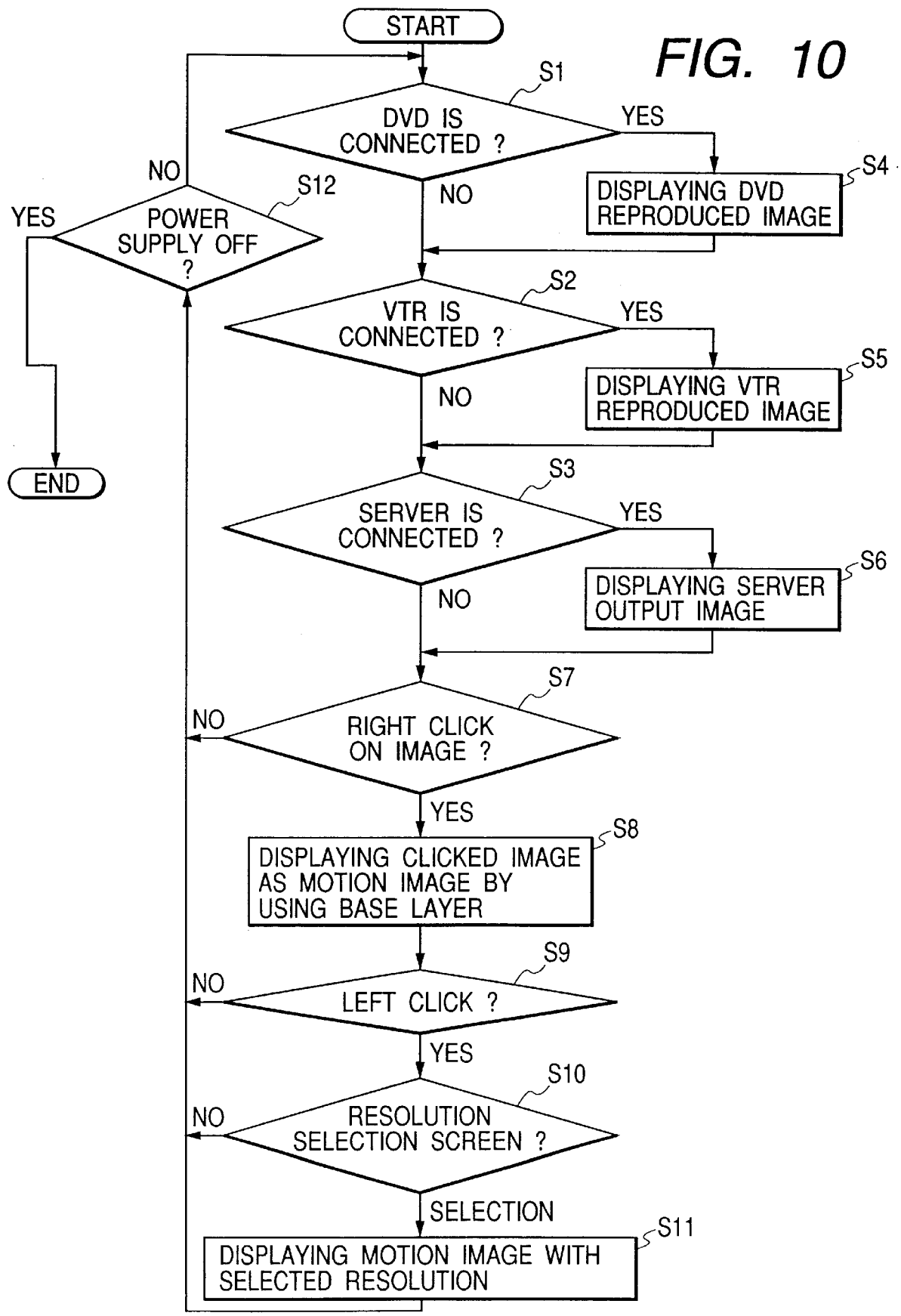
FIG. 10 is a flow chart for explaining the operation of the system in FIG. 9.

FIG. 10 is a flow chart for explaining the operation of the computer 58 in the system shown in FIG. 9. This operation will be described below with reference to FIGS. 10 and 11.

When the power switch of the computer 58 is turned on, the computer 58 checks in steps S1 to S3 whether the DVD reproduction apparatus 50, the digital VTR 52, or the server 56 is connected. If it is determined in one of these steps that the corresponding apparatus is connected, the image reproduced or output from the apparatus is displayed as an icon, as described above (steps S4 to S6). The image signal displayed in this case is not the motion image itself but is a representative image extracted from the common base layer. This display alone does not occupy much of the transmission rate of the interface between the computer 58 and each apparatus.

If the right mouse button is clicked while at least one image is displayed and the cursor 70 is moved onto the image by the mouse 68 (step S7), this image is displayed as a motion image by using the common base layer (step S8). In this case, since the common base layer with the minimum data amount is displayed, not much load is imposed on the interface. As is obvious from the flow chart of FIG. 10, when the cursor 70 is moved onto another image by the mouse 68, and the right mouse button is clicked, the clicked image is displayed as a motion image. In this case, the other image is restored to the newly extracted representative image described above.

If the cursor 70 is moved onto a motion image displayed by using the common base layer, and the left mouse button is clicked (step S9), resolution selection display is performed, as indicated by a frame 72 in FIG. 11 (step S10). If the cursor 70 is moved onto an arbitrary resolution (low resolution, high spatial resolution, or high time resolution) display, and the right mouse button of the mouse 68 is clicked, the corresponding resolution is selected. In accordance with this selection, the computer 58 supplies a selection signal to the video selection device 46 in FIG. 7 arranged in each apparatus to select an image signal with the desired resolution, receives it, and displays the corresponding motion image on the monitor (step S11). At this time, since this display is a desired display, the display mode is preferably switched to the full image display mode.

Detection in steps S1 to S3 and S7 is always performed. If is it detected in step S12, during this detection, that the power supply is turned off, the processing is terminated. If the right mouse button of the mouse 68 is clicked while the cursor 70 is located in the frame 72 during resolution selection screen display, it is determined that no resolution is selected, and the flow returns to the above detection loop. Note that the processing based on the above flow chart is executed by the program stored in a ROM 90 in the computer 58.

In the system using the apparatus on the decoding side and the decoding apparatus, the user can enjoy a desired image in real time by selectively using arbitrary scalability in accordance with a user's choice. This can save the wait time for unnecessary decoding required for an image search and the like. In addition, as described above, since no motion image is basically displayed, or a motion image can be displayed by transferring minimum necessary information, the time during which the interface or the CPU in the computer is occupied can be shortened, allowing quick operation.

In addition, the decoding circuit is also designed such that the circuit for the common base layer is commonly used for decoding of a plurality of enhancement layers. This arrangement is also advantageous in terms of a reduction in circuit size in each decoding apparatus.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image processing apparatus comprising:
   (a) a base layer generator, arranged to generate a base layer by reducing information of input image data with a plurality of kinds of scalable factors;
   (b) an enhancement layer generator, arranged to generate a plurality of kinds of enhancement layers of different kinds of scalable factors, wherein each of the plurality of kinds of enhancement layers is generated by using both the common information of input image data and the base layer; and
   (c) an encoder, arranged to encode the base layer and the plurality of kinds of enhancement layers and to transmit the encoded base layer and the encoded plurality of kinds of enhancement layers.

2. An apparatus according to claim 1, wherein said encoder serially processes the base layer and the plurality of kinds of enhancement layers.

3. An apparatus according to claim 1, wherein said encoder divides a luminance signal and color signal included in each of the layers into blocks each consisting of a plurality of pixels in vertical and horizontal directions, and forms macroblocks by combining predetermined numbers of luminance signal blocks and color signal blocks.

4. An apparatus according to claim 1, wherein the plurality of enhancement layers include a spatial enhancement layer having information for increasing a spatial resolution and a time enhancement layer for increasing a time resolution.

5. An apparatus according to claim 4, wherein the base layer is obtained by decreasing the spatial resolution and time resolution of the input image data, the spatial enhancement layer is formed from data obtained by decreasing the time resolution of the input image data and the base layer, and the time enhancement layer is formed from data obtained by decreasing the spatial resolution of the input image data and the base layer.

6. An apparatus according to claim 1, further comprising a selector arranged to selectively output the base layer, the plurality of kinds of enhancement layers, or the input image data.

7. An image processing method comprising the steps of:
   (a) generating a base layer by reducing information of input image data with a plurality of kinds of scalable factors;
   (b) generating a plurality of kinds of enhancement layers of different kinds of scalable factors, wherein each of the plurality of kinds of enhancement layers is generated by using both the common information of input image data and the base layer;
   (c) encoding the base layer and the plurality of kinds of enhancement layers; and
   (d) transmitting the encoded base layer and the encoded plurality of kinds of enhancement layers.

8. A method according to claim 7, wherein the encoding step comprises serially processing the base layer and the plurality of enhancement layers.

9. An image processing apparatus comprising:
(a) a reconstruction unit, arranged to extract encoded data of a base layer obtained from input data by reducing information of image data by using a plurality of kinds of scalable factors, and decode the encoded data of the base layer to reconstruct an image signal of the base layer; and
(b) a forming unit, arranged to extract encoded data of a plurality of kinds of enhancement layers of different kinds of scalable factors respectively from the input data, and to decode the encoded data of the plurality of kinds of enhancement layers each, to reconstruct a plurality of image signals according to the plurality of kinds of enhancement layers, wherein each of the plurality of kinds of enhancement layers is generated by using both the common information of input image data and the base layer.

10. An apparatus according to claim 9, wherein said forming unit serially processes the base layer and the plurality of kinds of enhancement layers.

11. An apparatus according to claim 9, wherein the data is encoded in units of blocks each including a plurality of pixels in vertical and horizontal directions, and said forming unit outputs data, input in units of blocks, in units of lines.

12. An apparatus according to claim 9, wherein said forming unit forms a plurality of image signals having a larger information amount than the reconstructed image signal of the base layer by using the plurality of kinds of enhancement layers and the base layer, decoded by said decoder.

13. An apparatus according to claim 12, further comprising a selector arranged to selectively output the image signal according to the base layer and the plurality of image signals having the larger information amount.

14. An apparatus according to claim 13, wherein said selector effects selection by manual operation.

15. An apparatus according to claim 13, wherein said selector comprises an image display unit, and said image display unit can display an image associated with the image signal of the base layer.

16. An apparatus according to claim 15, wherein said selector further comprises a pointing device arranged to designate a position on said display unit, and when an image associated with the image signal of the base layer is displayed, said pointing device designates a position on the image to select the plurality of image signals having the larger information amount so as to display the image signals.

17. An apparatus according to claim 15, wherein said display unit can simultaneously display image signals of a plurality of base layers from said reconstruction unit, and can select an image signal for displaying a motion image from the plurality of image signals.

18. An image processing method comprising the steps of:
(a) extracting encoded data of a base layer obtained from input data by reducing information of image data by using a plurality of kinds of scalable factors;
(b) decoding the encoded data of the base layer to reconstruct an image signal of the base layer;
(c) extracting encoded data of a plurality of kinds of enhancement layers of different kinds of scalable factors respectively from the input data; and
(d) decoding the encoded data of the plurality of kinds of enhancement layers each, to reconstruct a plurality of image signals according to the plurality of kinds of enhancement layers, by using the reconstructed image signal of the base layer, wherein each of the plurality of kinds of enhancement layers is generated by using both the common information of input image data and the base layer.

19. A method according to claim 18, further comprising a selection step of selectively outputting the image signal of the base layer and the plurality of image signals according to the plurality of kinds of enhancement layers.

20. An image processing method comprising the steps of:
(a) inputting a first image signal reconstructed from data of a common base layer obtained by reducing information of image data by using a plurality of kinds of scalable factors, and second and third image signals each of which is larger in information amount associated with a respective different one of the plurality of kinds of scalable factors than the image signal of the common base layer, reconstructed from data of a plurality of kinds of enhancement layers having information associated with the different one of the plurality of kinds of scalable factors and the data of the common base layer,
respective data of the plurality of kinds of enhancement layers being formed by using both the common image data and the base layer;
(b) selecting the first, second, or the third image signal; and
(c) displaying an image corresponding to the selected image signal.

21. A method according to claim 20, wherein the selection step comprises executing said selecting step by manual operation.

22. A method according to claim 20, wherein, in said selecting step, when an image associated with the first image signal is displayed, an image associated with the second or third image signal can be selected to be displayed by designating a position on the corresponding image using a pointing device for designating a position on a display screen.

23. A method according to claim 22, wherein a plurality of first image signals are input, images associated with the plurality of first image signals can be simultaneously displayed, and an image signal to be displayed as a motion image is selected from the plurality of image signals.

24. A computer-readable recording medium storing a program for executing the steps of:
(a) inputting a first image signal reconstructed from data of a common base layer obtained by reducing information of image data by using a plurality of kinds of scalable factors, and second and third image signals each of which is larger in information amount associated with a respective different one of the plurality of kinds of scalable factors than the image signal of the common base layer reconstructed from data of a plurality of kinds of enhancement layers having information associated with the different one of the plurality of kinds of scalable factors and the data of the common base layer,
respective data of the plurality of kinds of enhancement layers being formed by using both the common image data and the base layer;
(b) selecting the first, second, or the third image signal; and
(c) displaying an image corresponding to the selected image signal.

25. A computer-readable recording medium storing a program for executing the steps of:
(a) generating a base layer by reducing information of input image data with a plurality of kinds of scalable factors;

(b) generating a plurality of kinds of enhancement layers of different kinds of scalable factors respectively by using the base layer, wherein each of the plurality of kinds of enhancement layers is generated by using both the common information of input image data and the base layer;

(c) encoding the base layer and the plurality of kinds of enhancement layers; and (d) transmitting the encoded base layer and the encoded plurality of kinds of enhancement layers.

26. A computer-readable recording medium storing a program for executing the steps of:

(a) extracting encoded data of a base layer obtained by reducing information of image data by using a plurality of kinds of scalable factors, from input data;

(b) decoding the encoded data of the base layer to reconstruct an image signal of the base layer;

(c) extracting encoded data of a plurality of kinds of enhancement layers of different kinds of scalable factors respectively from the input data; and (d) decoding the encoded data of the plurality of kinds of enhancement layers, to reconstruct a plurality of image signals according to the plurality of kinds of enhancement layers, by using the reconstructed image signal of the base layer in common to the different kinds of scalable factors, wherein each of the plurality of kinds of enhancement layers is generated by using both the common information of image data and the base layer.

* * * * *

UNITED STATES PATENT AND TRADEMARK OFFICE
CERTIFICATE OF CORRECTION

PATENT NO. : 6,650,783 B2
DATED : November 18, 2003
INVENTOR(S) : Akiyoshi Hamanaka It is certified that error appears in the above-identified patent and that said Letters Patent is hereby corrected as shown below:

Column 1,
Line 32, "referred" should read -- referred to --.

Column 4,
Line 5, "unit" should read -- units --;
Line 66, "((intra-coded" should read -- (intra - coded --.

Column 8,
Line 37, "signal" should read -- signals --.

Column 10,
Line 49, "selectively" should read -- selectively --.

Signed and Sealed this

Twentieth Day of July, 2004

JON W. DUDAS
*Acting Director of the United States Patent and Trademark Office*